Jan. 23, 1940.  E. C. PATTEE  2,187,890

CONTINUOUS SOLVENT EXTRACTION APPARATUS

Filed Nov. 24, 1937

Ellis C. Pattee
INVENTOR

BY Pennie Davis Marvin & Edmonds
ATTORNEYS

Patented Jan. 23, 1940

2,187,890

UNITED STATES PATENT OFFICE 2,187,890

CONTINUOUS SOLVENT EXTRACTION APPARATUS

Ellis Charles Pattee, Cincinnati, Ohio, assignor to National Distillers Products Corporation, New York, N. Y., a corporation of Virginia Application November 24, 1937, Serial No. 176,309

6 Claims. (Cl. 23—270)

This invention relates to an apparatus for the continuous extraction of materials such as rice bran, oleaginous seeds or their flakes, distillers' grains, caliche, wood chips and the like by liquid solvents such as water, liquid hydrocarbons, chemical solutions, or other liquids.

The apparatus of this invention comprises a vessel into which the solid material and the solvent are introduced and mixed, and a conveyor which carries off the extracted material to discharge it at a level above the solvent level within the vessel. The material may be then treated to separate the solvent from the extracted material.

For a better understanding of the invention, I have illustrated one embodiment of it in the accompanying drawing, in which.

Figure 1:
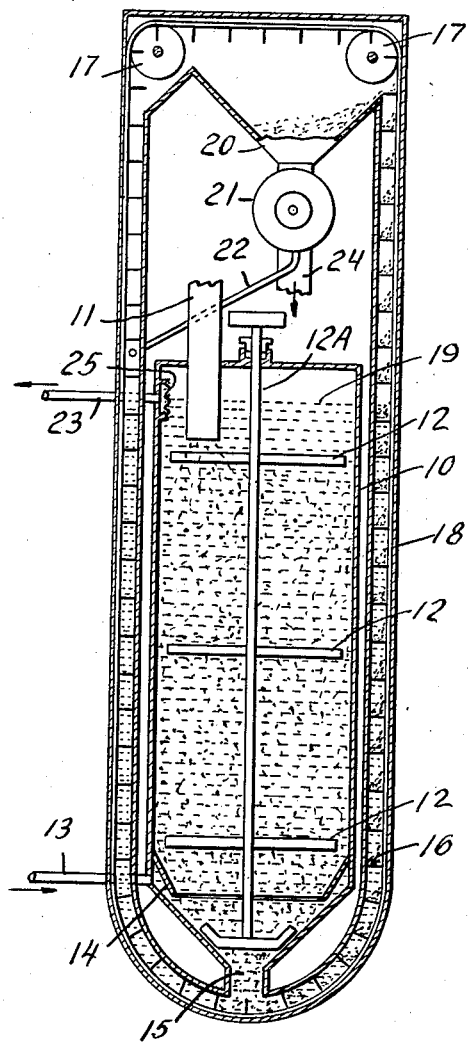
Figure 1 is a vertical section of the apparatus.
Figure 2:
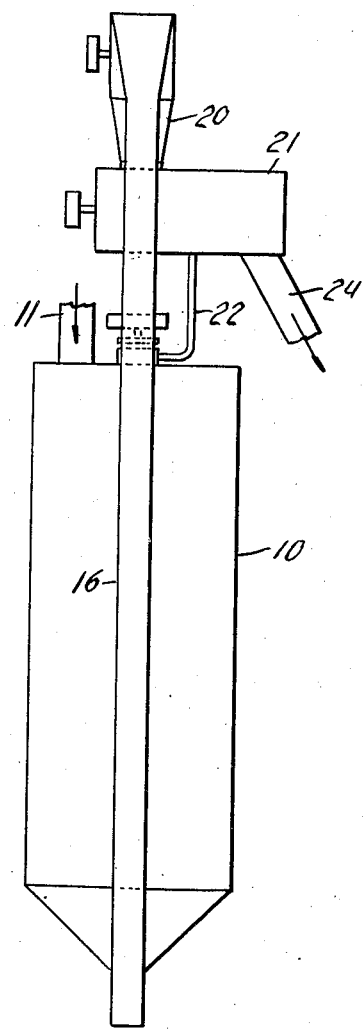
Figure 2 is a side elevation thereof.

The new extractor may be of any convenient size and be employed in the treatment of material of particles of any size. In the apparatus illustrated 10 represents an elongated vertically mounted metallic vessel into which the material to be extracted is fed through a feed spout 11 projecting into the upper end of the vessel and agitated by means of arms 12 mounted on a rotatable shaft 12A. The solvent employed in the extraction enters the vessel through a pipe 13 located in the lower portion of the vessel and is uniformly distributed around the periphery of the vessel by the baffle 14.

When the material has been extracted it is removed from the bottom of the vessel through an outlet 15 to an endless conveyor 16 mounted on rollers 17. The conveyor is driven in the usual manner and is entirely enclosed by a cover 18. When the extracted material has been carried from the outlet 15 by the conveyor to a level above that of the solvent level 19 in the vessel, it is discharged by the conveyor into a bin 20 and thence to a press 21 which compresses the material so that a large part of the solvent is removed and is carried off through the drain 22 and returned to the endless conveyor. The solvent is then carried by the conveyor to the outlet 15 in the bottom of the vessel where it enters the vessel and is mixed with the material therein. Since the solvent is generally lighter than the material to be extracted, the free solvent tends to rise within the vessel and flows off through an outlet 23 provided in the upper portion of the vessel above the level of the lower end of the feed spout 11. The solid material having been compressed for removal of the solvent passes out through a spout 24 to a suitable storage container. In order to prevent particles of the material being extracted from escaping with the solvent and to prevent particles of the material from clogging the outlet 23, a strainer 25 is placed across the opening of the outlet. The solvent carried off through the outlet 23 may be stored in any desired type of container, or recirculated through the extraction.

In the described operation of the extraction apparatus, the material and the solvent enter the vessel so as to provide a counter-current flow of the material and the solvent. The operation is not limited to this, however, since any practical variation may be employed, such as for example, operating so as to move the solvent and the material through the vessel in the same direction. In case a parallel flow of the material and the solvent is employed, the solvent enters the vessel through outlet 23 and the solvent which has been through the extraction process is withdrawn through the pipe 13, while the solid material enters the vessel through the feed spout 11 and is moved out through the outlet 15 as described before.

The apparatus of this invention will be found to have many advantages over the extractors now in use. In this apparatus, there can be no loss of solvent during the process of extraction, since the apparatus is entirely enclosed and there are no openings below the solvent level. Since the extracted residual material may be mechanically pressed before it leaves the apparatus, and most of the solvent thereby obtained, the amount of evaporation to recover the solvent and to dry the solid material is reduced.

I claim:

1. An apparatus for continuous extraction comprising, an extracting vessel for commingling an extracting solvent and material to be extracted, the vessel having inlets for the solvent and the material and having a discharge outlet at its lower portion, an expressing chamber above the extracting vessel, a vertically extending housing encircling the extracting vessel and the expressing chamber connecting with the discharge outlet in the extracting vessel, an opening in the housing above and connecting with the expressing chamber, an endless conveyor within the housing for raising the material from the discharge outlet to the expressing chamber, a conduit leading from the expressing chamber to the housing on the side on which the endless conveyor descends, and an outlet from the expressing chamber for carrying off the extracted material.

2. An apparatus for continuous extraction comprising, an extracting vessel for commingling an extracting solvent and material to be extracted, the vessel having inlets for the solvent and the material, a baffle within the vessel across the solvent inlet for mixing the solvent and the material, the extracting vessel having a discharge outlet at its lower portion, an expressing chamber above the extracting vessel, a vertically extending housing encircling the vessel and the extracting chamber connecting with the outlet discharge of the vessel and having an opening above and connecting with the expressing chamber, an endless conveyor within the housing for raising the material from the discharge outlet to the expressing chamber, a conduit leading from below the expressing chamber to the housing on the side on which the conveyor descends, and an outlet from the expressing chamber for carrying off the extracted material.

3. An apparatus for continuous extraction comprising, an extracting vessel for commingling an extracting solvent and material to be extracted, the vessel having inlets and outlets for solvent, an inlet for material in the top of the vessel extending into the vessel to a point below the outlet for the solvent, an annular baffle across the solvent inlet within the vessel for mixing the solvent and the material, the extracting vessel having a discharge outlet at the bottom, an expressing chamber above the extracting vessel, a vertically extending housing encircling the extracting vessel and the expressing chamber connecting with the outlet discharge and having an opening above and connecting with the expressing chamber, an endless conveyor mounted within the housing for raising the material from the outlet of the vessel to the expressing chamber, a solvent conduit leading from the expressing chamber to the housing on the side in which the conveyor descends, and an outlet from the expressing chamber for the extracted material.

4. An apparatus for continuous extraction comprising, an extracting vessel for commingling an extracting solvent and material to be extracted, the vessel having inlets and outlets for solvent, an inlet for material to be extracted and and a discharge outlet at the lower portion of the vessel, an expressing chamber above the extracting vessel, a housing encircling the extracting vessel and the expressing chamber and having openings connecting the discharge outlet and connecting with the expressing chamber, an endless conveyor mounted within the housing for raising the material from the discharge outlet to the expressing chamber, a conduit leading from the expressing chamber to return the expressed solvent to the extracting vessel and an outlet from the expressing chamber for carrying off the extracted material.

5. An apparatus for continuous extraction comprising, an extracting vessel for commingling an extracting solvent and material to be extracted, the vessel having inlets for the solvent and the material, an outlet for the solvent near the top of the vessel and above the level of the inlet for the material, and a discharge outlet in the bottom of the vessel, an expressing chamber above the vessel, a housing encircling the vessel and the expressing chamber, the housing having an opening connecting the outlet discharge and an opening above and connecting with the expressing chamber, an endless conveyor mounted within the housing for raising the extracted material from the discharge outlet to the expressing chamber, the expressing chamber having a conduit for returning the expressed solvent to the extracting vessel and an outlet from the expressing chamber for carrying off the extracted material.

6. An apparatus for continuous extraction comprising, a vessel for commingling an extracting solvent and material to be extracted, the vessel having a discharge outlet at the bottom thereof, an expressing chamber above the vessel, a housing encircling the vessel and the housing having an opening connecting with the discharge outlet of the vessel and an opening above the expressing chamber, an endless conveyor mounted in the housing provided with means for carrying the extracted material from the discharge outlet to the expressing chamber, a conduit from the expressing chamber for returning the expressed solvent to the extraction vessel, and a second outlet from the expressing chamber for carrying off the extracted material.

ELLIS CHARLES PATTEE.